United States Patent [19]

Henriksson

[11] Patent Number: 5,453,180
[45] Date of Patent: Sep. 26, 1995

[54] STRAINER FOR FILTERING WATER TO AN EMERGENCY COOLING SYSTEM IN A NUCLEAR POWER PLANT

[75] Inventor: Mats E. Henriksson, Alvkarleby, Sweden

[73] Assignee: Vattenfall Utveckling AB, Alvkarleby, Sweden

[21] Appl. No.: 256,395

[22] PCT Filed: Dec. 3, 1993

[86] PCT No.: PCT/SE93/01042

§ 371 Date: Jul. 12, 1994

§ 102(e) Date: Jul. 12, 1994

[87] PCT Pub. No.: WO94/13384

PCT Pub. Date: Jun. 23, 1994

[30] Foreign Application Priority Data

Dec. 4, 1992 [SE] Sweden ............... 9203677-1

[51] Int. Cl.6 ............... B01D 29/33; B01D 35/02; B01D 35/027
[52] U.S. Cl. ............... 210/167; 210/408; 210/411; 210/443; 376/313
[58] Field of Search ............... 210/437, 443, 210/333.01, 167, 354, 408, 411; 376/313

[56] References Cited

U.S. PATENT DOCUMENTS

| | | |
|---|---|---|
| 3,066,803 | 12/1962 | Seils, Jr. ............... 210/443 |
| 3,071,251 | 1/1963 | Szwargulski ............... 210/437 |
| 3,164,164 | 1/1965 | Pall et al. ............... 210/443 |
| 3,187,898 | 6/1968 | 5Baker ............... 210/333.01 |
| 3,392,842 | 7/1968 | Anderson ............... 210/411 |
| 3,545,621 | 12/1970 | Lamort ............... 210/333.01 |
| 4,834,885 | 5/1989 | Misgen et al. ............... 210/443 |
| 4,969,994 | 11/1990 | Misgen et al. ............... 210/443 |
| 5,104,537 | 4/1992 | Stifelman et al. ............... 210/443 |

FOREIGN PATENT DOCUMENTS 1599051  10/1990  U.S.S.R. ............... 210/333.01

*Primary Examiner*—Stanley S. Silverman
*Assistant Examiner*—Theodore M. Green
*Attorney, Agent, or Firm*—McFadden, Fincham

[57] ABSTRACT

A back-flushable strainer is used for filtering water to an emergency cooling system in a nuclear power plant having a reactor arranged in a containment whose lower part forms a condensation pool in which the strainer is mounted. The strainer has a suitably cylindrical strainer wall having a plurality of perforations through which the water flows from the outside and in when filtering, while the direction of flow is the reverse in backflushing. A number of wings are arranged on the outside of the strainer wall, dividing a residue or fibre mat built up on the outside of the strainer wall into a number of sections which separately are more easily released than a continuous, circumferential fibre mat.

5 Claims, 5 Drawing Sheets

STRAINER FOR FILTERING WATER TO AN EMERGENCY COOLING SYSTEM IN A NUCLEAR POWER PLANT

FIELD OF THE INVENTION

This invention relates to a strainer for filtering water to at least one emergency cooling system in a nuclear power plant of the type comprising a reactor arranged in a containment whose bottom part forms a pool for collecting water formed by condensation of steam present in the containment, the strainer being arranged in the condensation pool and serving to filter water which is taken from the pool and, if required, is supplied to nozzles in the emergency cooling system in order to cool the reactor core in the event of an inadmissible temperature rise therein, the strainer further having the shape of a housing with at least one, suitably cylindrical, apertured strainer wall through which the water can flow from the outside and into the housing, and being connected, by a first conduit, to a suction pump disposed outside the reactor containment, as well as connected to a second conduit for supplying wash water to the interior of the housing in order, if required, to flush the strainer wall by flowing the wash water through it from the inside and out, thereby removing filtrate deposited on the outside of the strainer wall.

BACKGROUND OF THE INVENTION

In actual practice, the above-mentioned emergency cooling system consists of a first sprinkler system comprising a plurality of nozzles or sprinklers mounted in the upper part of the reactor and adapted to spray large amounts of water on the fuel rods in order to cool these when there is an emergency. The plant further includes a second sprinkler system comprising a plurality of nozzles or sprinklers which, like those of the first system, take their water from the condensation pool in the containment, but which are mounted outside the reactor proper and are adapted to sprinkle the gas phase in the containment in order to reduce any remaining excess pressure therein as well as to cool conduits or other components found inside the containment but outside the reactor itself. In both instances, it is of great importance that the water supplied to the nozzles is free from all sorts of impurities, such as fibres, grains and particles, that might clog the nozzles. Naturally, this is especially important in the emergency cooling system, which has to be absolutely reliable. Many of the components mounted inside the containment, such as the conduits, are wholly or partly heat insulated. In most of today's nuclear power plants, this insulation is made up of fibres of mineral wool, which constitute an element of risk with regard to the two sprinkler systems, in that unintentionally released fibres may clog the nozzles if reaching the sprinkler systems. For this reason, nuclear power plants have been equipped with strainers of the type stated by way of introduction.

In actual practice, it takes about 5–10 min to back-flush a conventional strainer which is contaminated with a fibre mat tending to clog the strainer holes. It was previously held that the strainers could operate for at least 10 h without any need of back-flushing. However, real-life incidents have shown that this estimated minimum operating time is too long. In functional tests, it has happened that discharged steam has entrained mineral-wool insulation, which has dropped into the condensation pool and clogged the-strainers even after about 30 min. Back-flushing, which takes 5–10 min, is not a critical operation 10 h after a possible reactor trip, since the decay power of the reactor core then has been considerably reduced, as has the need for cooling. However, if back-flushing is required after less than 1 h, the need for cooling of the core is still considerable, and an interruption of the water supply to the emergency cooling system for 5–10 min therefore is unacceptable for reasons of safety.

One reason why back-flushing of the strainer takes such a comparatively long time is that the fibres accumulating on the outside of the strainer wall form a continuous, circumferential mat or cake in which they are closely intertwined. The wash water flowed from the inside and radially outwards through the perforations in the strainer wall does not provoke any immediate release of the entire mat, but initially merely stretches the mat while breaking up the fibre structure, so that individual fibres are successively released and removed from the mat. It is only after considerable hydromechanical action that the mat grows weaker and is successively divided into chunks that leave the strainer wall. Another reason is that the wash water is allowed to flow into the strainer along a substantially axial path, which entails considerable local variations of the flow intensity in the different perforations in the strainer wall. To be more precise, the flow concentrates in the upper end of the housing that is opposite to the inlet end. This means that the fibre mat will be released in chunks, beginning at the upper part of the housing and proceeding downwards. In this late phase, considerable amounts of wash water will flow through the upper, already uncovered perforations without affecting the lower perforations still coated with fibres.

SUMMARY OF THE INVENTION

This invention aims at obviating the above-mentioned inconveniences of prior-art strainers and providing a strainer which at all times enables rapid, effective and reliable back-flushing. A basic object of the invention is, therefore, to provide a back-flushable strainer which does not require prolonged hydromechanical working to make the accumulated fibres let go. Another object of the invention is to improve the hydrodynamic properties of the strainer, such that the incoming wash water is efficiently utilised and the flow variations in the different perforations are reduced.

At least the basic object of the invention is achieved by a strainer having the features recited in the characterising clause of appended claim 1.

BRIEF DESCRIPTION OF THE DRAWINGS

In the drawings,

In FIG. 1, the wall 1 is indicated by a single arcuate line. In practice, however, this wall is composed of a very thick reinforced concrete wall and a leak-proof lining of non-corrosive sheet-metal arranged on the inside thereof. A number of columns 2, 2', which form part of the loadbearing structure of the containment, are arranged at a distance inwardly of the cylindrical wall. Such columns, which can be made of concrete, are in practice evenly distributed along the periphery of the cylindrical wall, e.g. at a pitch of 12.5°. Each column may have a diameter of 0.8–1.0 m. Adjacent to the cylindrical wall, there is provided a back-flushable strainer 3 which is connected to a first conduit 4 extending through the wall 1 and connected to a suction pump (not shown) on the outside thereof. The strainer is kept in place by means of brackets 5 (see FIG. 2) which are connected to attachments 6 anchored in the wall 1. To the strainer is connected a wash-water conduit 7 serving to supply either clean water from outside or filtered water to the interior of the strainer in order to flush the strainer wall. It should be pointed out that the strainers in the nuclear power plant are arranged in the vicinity of the bottom 8 of the containment 1 at a considerable distance below the normal water level 9 in the condensation pool formed by the bottom part of the containment.

DESCRIPTION OF THE PREFERRED EMBODIMENT

Reference is now made to FIGS. 3–7 which in detail illustrate the structure of the strainer 3 according to the invention.

Figure 1:
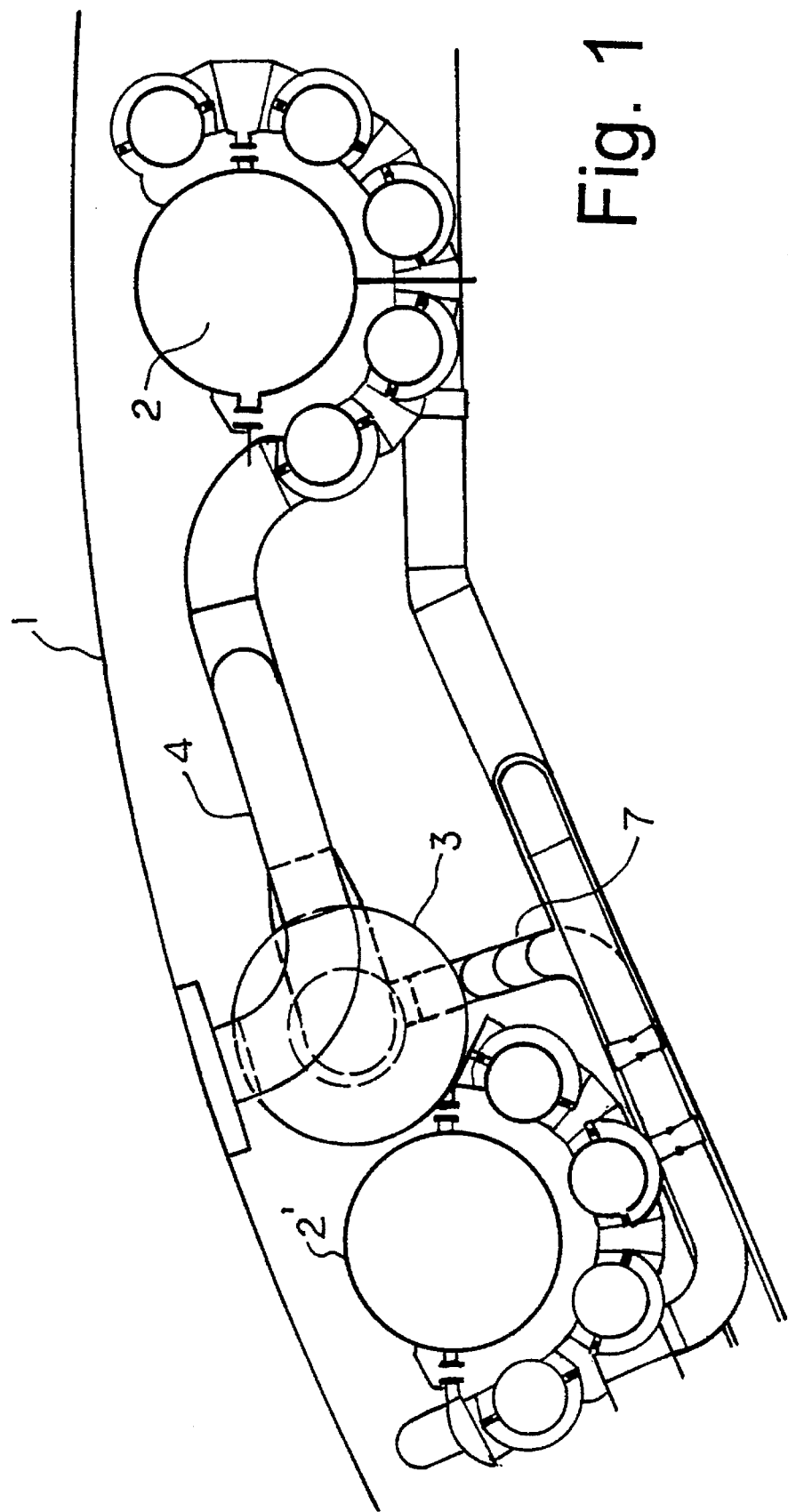
FIG. 1 is a schematic plan view showing part of a containment as well as a number of strainers adjacent to the cylindrical containment wall.
Figure 2:
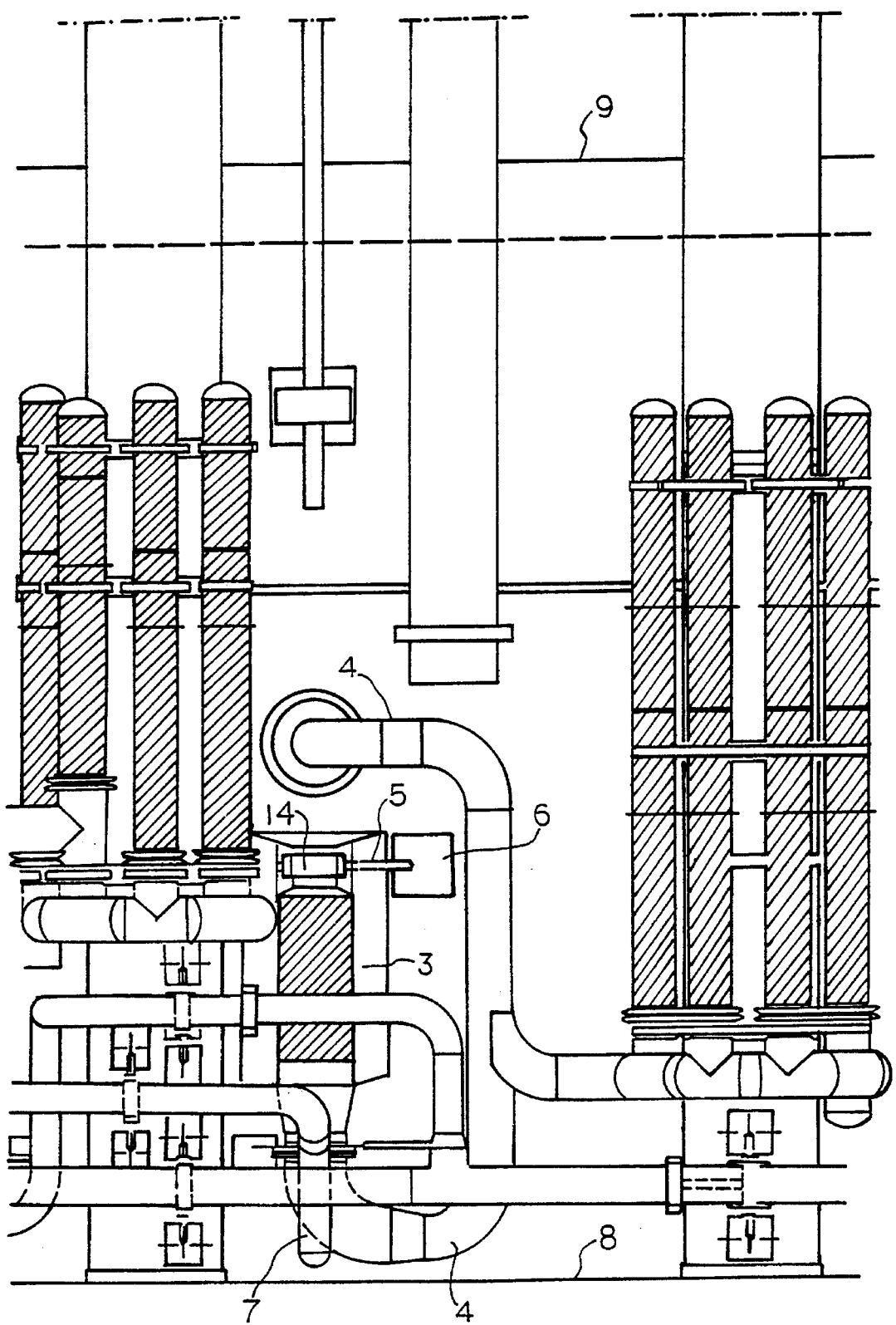
FIG. 2 is an elevational view showing the strainers in FIG. 1.
Figure 3:
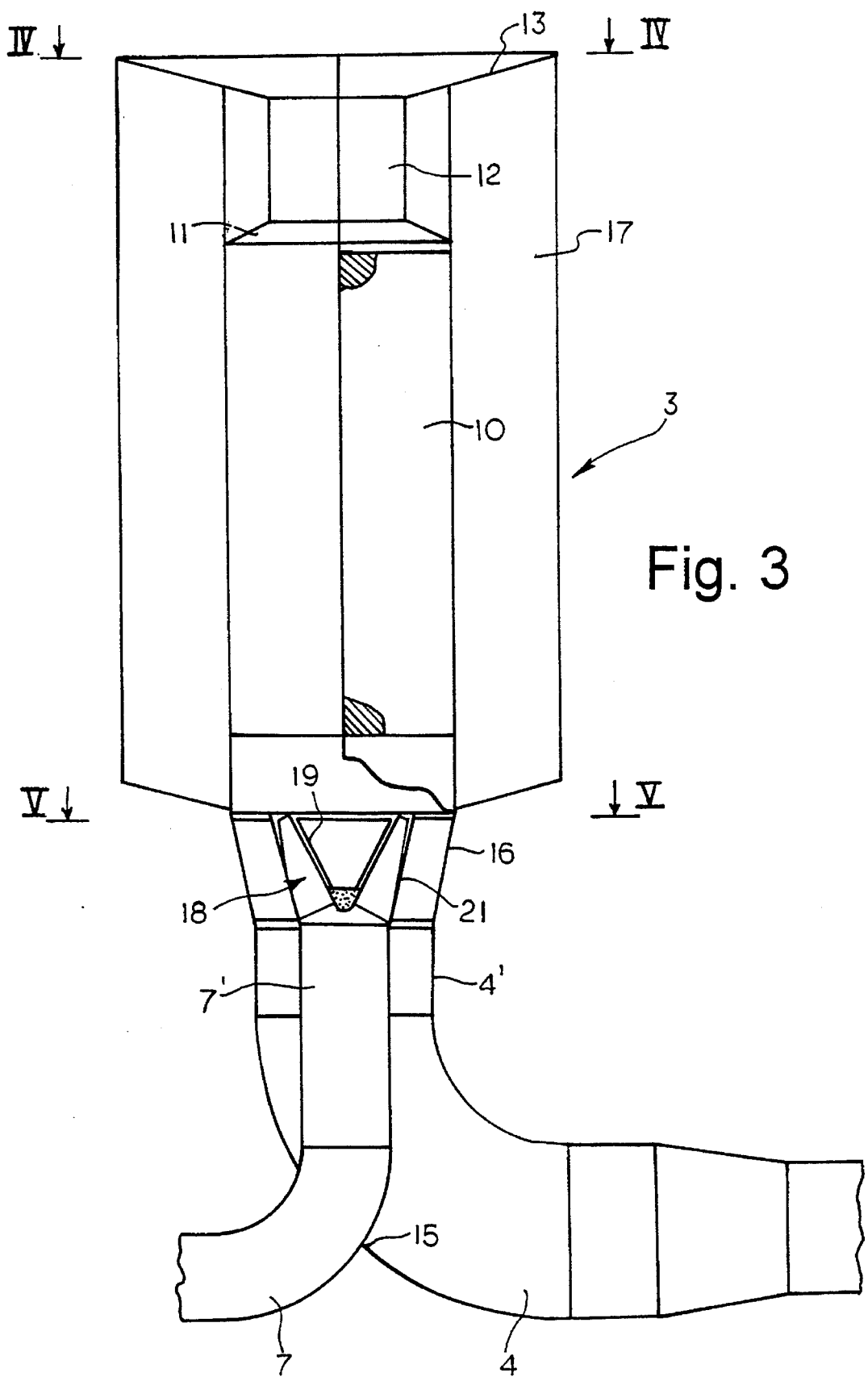
FIG. 3 is an enlarged vertical section of a back-flushable strainer according To the invention.
Figure 4:
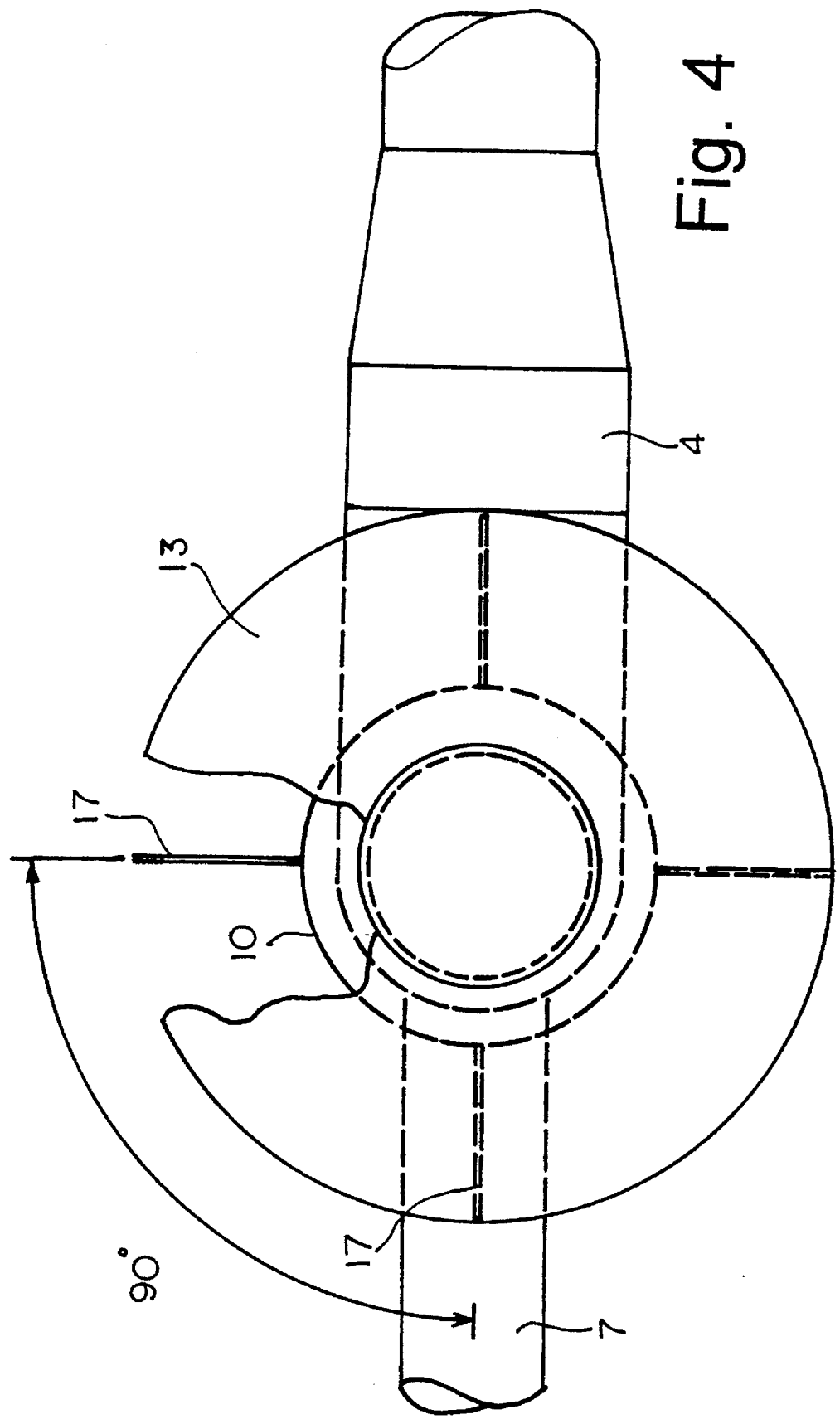
FIG. 4 is a horizontal section taken along IV—IV in FIG. 3.

As appears most clearly from FIGS. 3 and 4, the strainer 3 has the shape of a housing which essentially consists of a cylindrical strainer wall or tube 10, e.g. made of perforated sheet-metal. In practice, the strainer tube 10 may have a length of 0.7–1.5 m, suitably about 1.0 m, and a diameter of 0.4–0.6 m, suitably about 0.5 m. The perforations may have a diameter in the range of 2–4 mm, the total perforation area of the strainer wall being in the range of 25–40%, suitably 30–35%. Such dimensions permit a flow in the range of 100–250 kg/s through the strainer wall. In the embodiment illustrated, the strainer tube 10 is vertically oriented and closed at the upper end. To be more precise, the strainer tube 10 merges, via a frustoconical portion 11, into a comparatively narrow throat 12, which ends with a frustoconical metal sheet 13 whose diameter much exceeds that of the strainer tube 10. A clamp 14 (see FIG. 2) can be connected to the throat 12, the clamp being in turn kept in place by the brackets 5. The lower end of the strainer tube 10 is open and connected to the first conduit 4, which is connected to the suction pump. The conduit 7 for supplying wash water to the interior of the strainer has a smaller diameter Than the conduit 4, in which it is inserted through a hole 15 in a curved portion thereof, the portion 7' located inside the conduit 4 being concentrically arranged with respect to the straight portion 4' of the conduit 4 connecting to the strainer tube 10. The diameter of the portion 4' is slightly smaller than that of the strainer Tube 10, a conically tapering collar 16 being provided at the transition therebetween.

According to the invention, the strainer tube 10 is, on the outside, provided with a number of longitudinal, peripherally spaced-apart and radially projecting wings or wing-like elements 17. In the embodiment illustrated, the strainer has four wings 17 arranged at a pitch of 90° and extending axially along the entire length of the strainer tube 10 and all the way up to the frustoconical metal sheet 13 serving as an attachment for the wings. Advantageously, the width of the wings is in the range of 25– 75% of the diameter of the strainer tube 10, suitably about 50% thereof. In conventional strainers without wings, the fibres deposit in the form of an elastic, continuous and circumferential mat, in which the fibres are fairly closely intertwined. Such a continuous fibre mat offers a considerable resistance to release from the strainer wall in back-flushing. However, the wings 17 provided on the inventive strainer divide the fibre mat into a number of separate sections, in this case four, which individually are much more easily released from the strainer wall.

In the embodiment illustrated, the wings consist of whole, straight metal sheets of uniform width of approximately the same size as the radius of the strainer tube 10. As a result, fibre layers having a thickness of up to the radius of the strainer tube may build up on the outside of the tube without the fibres located on each side of the separate wings coming into contact with one another.

Of course, it is conceivable to use other means than the illustrated wings for dividing the fibre mat into a suitable number of separate and easily released sections. Thus, use can be made of other, long or short projections from the outside of the strainer tube, provided that the fibre mat is divided into sections, as desired. The division of the mat need not be absolute in the sense that the fibres in one section have no contact whatsoever with those in the adjoining sections. Thus, the fibre sections may be separated by weakened zones which form rupture lines and in which minor amounts of fibres are kept loosely intertwined without offering any appreciable resistance to the release of adjoining fibre sections. Thus, one possibility would be to interrupt the perforation of the strainer wall 10 along axial, separate wall portions of suitable width.

Compared with conventional strainers, the inventive strainer has been considerably improved by the provision of a rotation-generating means, generally designated 18, adjacent to the opening of the wash-water conduit 7 close to the strainer. As appears from FIG. 3 in combination with FIGS. 5–7, the rotation-generating means consists of a conical body 19 centrally arranged in the conduit 7, and a plurality of curved blades 20 arranged on the outside of the body 19. The conduit 7, or more specifically the straight portion 7' thereof, ends with a conically tapering collar or tubular element 21, as the portion 4'. The blades 20 extend between the inside of the collar 21 and the outside of the centrally-arranged body 19. The conicity of the centrally-arranged body 19 is so adjusted to the conicity of the collar 21 that the flow-through area of any optional horizontal cross-section along the vertical centre axis is essentially the same. As appears from FIG. 5, the upper portions of the blades 20 adjacent to the annular opening passage are inclined in relation to the radial direction, and the blades have a curved shape, as can be seen in FIG. 6. Jointly, these features result in that the water supplied axially to the strainer by the rotation-generating means 18 will be caused to rotate or circle so that, under the action of the centripetal force, it will be pressed outwards against the strainer wall 10 rather than move in an axial, vertical flow. In this manner, the wash water will be pressed out through the holes in the strainer wall with much greater force than in conventional strainers.

Figure 5:
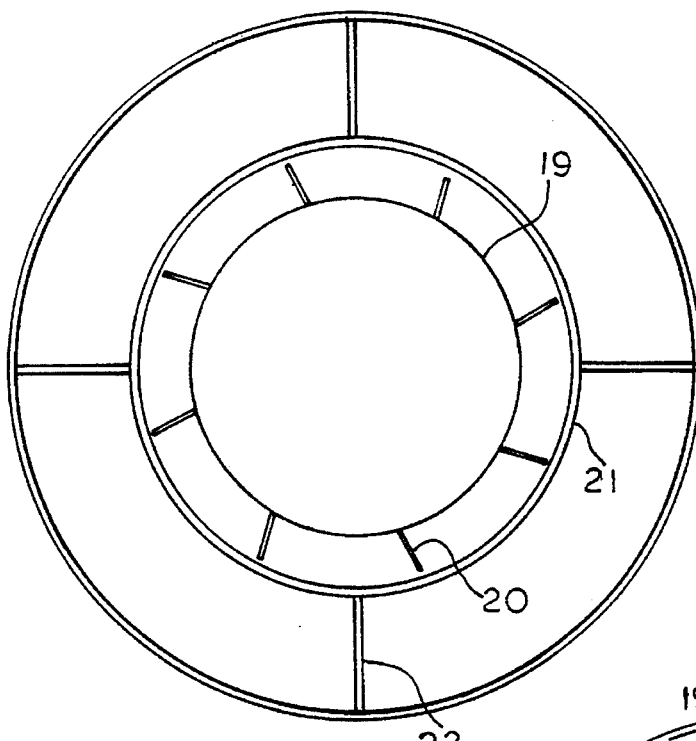
FIG. 5 is a similar, enlarged section taken along V—V in FIG. 3.
Figure 6:
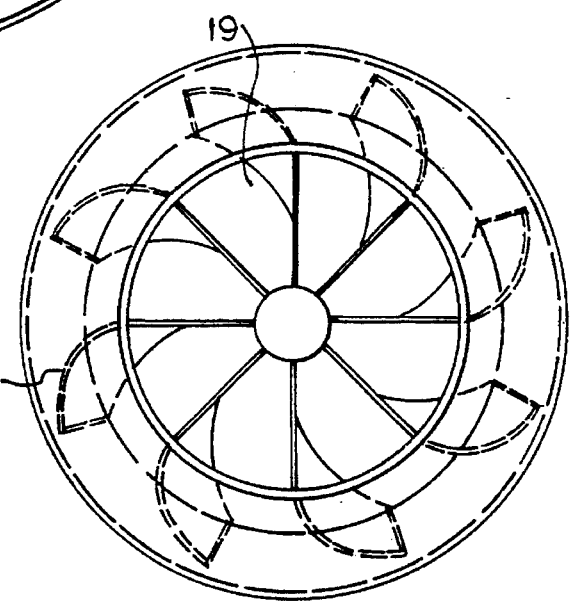
FIG. 6 is an enlarged horizontal section showing a rotation-generating means connected to the strainer.
Figure 7:
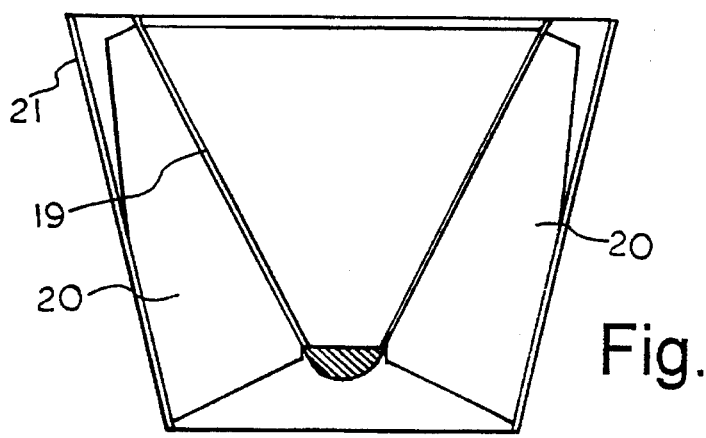
FIG. 7 is a vertical section of the rotation-generating means In FIG. 1, the reference sign 1 generally designates a cylindrical wall forming the containment of a reactor (not shown) that is part of a nuclear power plant.

It may be mentioned that the collar 21 is maintained in its concentric position with respect to the collar 16 by means of a suitable number of radially projecting flanges 22, as shown in FIG. 5. Tests have shown that fibre buildups on the inventive strainer are removed in their entirety in less than 20 s.

CONCEIVABLE MODIFICATIONS OF THE INVENTION

It goes without saying that the invention is by no means restricted to the embodiment described above and shown in the drawings. Thus, a folded fine strainer, e.g. made up of straining cloth, may be arranged inside the strainer tube 10. The external, perforated cylindrical wall 10 then serves as a prestrainer for the internal straining cloth serving as a fine strainer, which then is protected by the external and much stronger cylindrical strainer wall. Instead of straight, axial wings, use may be made of curved wings extending helically along the outside of the strainer tube. Although the strainer wall 10 described above and shown in the drawings is cylindrical or tubular, it may have some other shape and e.g. be flat, undulated or polygonal.

I claim:

1. A strainer for filtering water to at least one emergency cooling system in a nuclear power plant having a reactor arranged in a containment whose bottom part forms a pool for collecting water formed by condensation of steam present in the containment, the strainer being arranged in the condensation pool and serving to filter water which is taken from the pool and, if required, is supplied to nozzles in the emergency cooling system in order to cool the reactor core in the event of an inadmissible temperature rise therein, the strainer having a housing with at least one, apertured strainer wall through which the water can flow from the outside and into the housing, and being connected, by a first conduit, to a suction pump disposed outside the reactor containment, as well as connected to a second conduit for supplying wash-water to the interior of the housing in order to flush the strainer wall by flowing the wash-water through it from the inside and out, thereby removing residue deposited on the outside of the strainer wall, and wherein the strainer wall has means for dividing a fibre mat or layer built up on the outside of the strainer wall into several part sections which separately are more easily released than a continuous fibre mat.

2. A strainer as set forth in claim 1, wherein the means comprise a number of longitudinal, peripherally spaced-apart and radially projecting wings or wing-like elements.

3. A strainer as set forth in claim 2, wherein each wing has a width within the range of 25–75%, of the maximum cross-sectional dimension of the strainer wall.

4. A strainer as set forth in claim 1, wherein the second conduit consists of a tube which, in the area of an opening concentrically located in relation to the strainer wall, is provided with a rotation-generating means in the form of a set of curved blades extending between the tube and a substantially conical body located centrally therein, so that water passing through the annular gap between the tube and said body is caused to rotate or circle in order to be pressed out against the strainer wall.

5. A strainer as set forth in claim 1, wherein the housing is closed at one end, the first conduit is connected to the opposite end, and the wash-water conduit is concentrically inserted in a portion of the first conduit.

* * * * *